US007578325B2

(12) United States Patent
Freese et al.

(10) Patent No.: US 7,578,325 B2
(45) Date of Patent: Aug. 25, 2009

(54) HYBRID ROUTER

(75) Inventors: John B. Freese, Evanston, IL (US); Bjorn J. Gunderson, Chicago, IL (US); Robert H. Bruno, Avon, CT (US)

(73) Assignee: Credo Technology Corporation, Broadview, IL (US)

( * ) Notice: Subject to any disclaimer, the term of this patent is extended or adjusted under 35 U.S.C. 154(b) by 0 days.

(21) Appl. No.: 11/899,450

(22) Filed: Sep. 6, 2007

(65) Prior Publication Data

US 2008/0000546 A1 Jan. 3, 2008

Related U.S. Application Data

(63) Continuation of application No. 10/615,726, filed on Jul. 9, 2003, now Pat. No. 7,290,575.

(51) Int. Cl.
*B27C 5/10* (2006.01)
*B23C 1/12* (2006.01)

(52) U.S. Cl. .................. 144/136.95; 409/182; 409/210; 409/218; 409/220

(58) Field of Classification Search ............ 144/136.95, 144/154.5; 409/182, 206, 210, 218–220
See application file for complete search history.

(56) References Cited

U.S. PATENT DOCUMENTS

| | | | | |
|---|---|---|---|---|
| 3,487,747 | A | 1/1970 | Burrows et al. | |
| 3,587,387 | A | 6/1971 | Burrows | |
| 4,445,811 | A * | 5/1984 | Sanders | 409/182 |
| D286,131 | S | 10/1986 | Yamamoto | |
| D286,132 | S | 10/1986 | Yamamoto | |
| D300,501 | S | 4/1989 | Zurwelle | |
| D307,104 | S | 4/1990 | Monobe et al. | |
| 4,938,264 | A | 7/1990 | Ferenczffy | |
| 5,181,813 | A | 1/1993 | McCracken | |
| 5,188,492 | A | 2/1993 | McCracken | |
| 5,207,253 | A | 5/1993 | Hoshino et al. | |
| 5,273,089 | A * | 12/1993 | Fuchs et al. | 144/154.5 |
| D349,637 | S | 8/1994 | Hoshino et al. | |
| 5,353,852 | A | 10/1994 | Stolzer et al. | |
| 5,590,988 | A | 1/1997 | Rusconi | |
| 5,662,440 | A | 9/1997 | Kikuchi et al. | |
| 5,671,789 | A | 9/1997 | Stolzer et al. | |
| 5,853,273 | A | 12/1998 | Coffey | |
| 5,853,274 | A | 12/1998 | Coffey et al. | |
| 5,913,645 | A | 6/1999 | Coffey | |
| D416,460 | S | 11/1999 | Bosten et al. | |
| 5,988,241 | A | 11/1999 | Bosten et al. | |
| 6,065,912 | A | 5/2000 | Bosten et al. | |
| 6,113,323 | A | 9/2000 | Bosten et al. | |
| 6,139,229 | A | 10/2000 | Bosten et al. | |

(Continued)

*Primary Examiner*—Shelley Self
(74) *Attorney, Agent, or Firm*—Greer, Burns & Crain, Ltd.

(57) ABSTRACT

A hybrid router is disclosed that is capable of operating as a fixed or a plunge router wherein the preferred embodiment thereof comprises a motor assembly that has a housing containing a motor as well as operating handles attached to the housing and operating controls for operating the motor. The motor assembly can be removably installed in either a fixed base assembly or a plunge base assembly. The preferred embodiment has an adjustment knob that is located on the motor assembly that engages depth adjustment mechanisms of either the fixed and plunge base assemblies when the motor assembly is installed in the respective base assemblies.

6 Claims, 19 Drawing Sheets

U.S. PATENT DOCUMENTS

| | | | |
|---|---|---|---|
| 6,182,723 | B1 | 2/2001 | Bosten et al. |
| 6,261,036 | B1 | 7/2001 | Bosten et al. |
| 6,419,429 | B1 | 7/2002 | Long et al. |
| 6,443,675 | B1 | 9/2002 | Kopras et al. |
| 6,474,378 | B1 | 11/2002 | Ryan et al. |
| 6,488,455 | B1 | 12/2002 | Staebler et al. |
| 6,725,892 | B2 | 4/2004 | McDonald et al. |
| 6,726,414 | B2 | 4/2004 | Pientka et al. |
| 6,779,954 | B2 | 8/2004 | Tomayko |
| 2002/0043294 | A1 | 4/2002 | McDonald et al. |
| 2003/0002948 | A1 | 1/2003 | Hathcock et al. |

* cited by examiner

HYBRID ROUTER

CROSS REFERENCE TO RELATED APPLICATION

This is a continuation of application Ser. No. 10/615,726, filed Jul. 9, 2003 now U.S. Pat. No. 7,290,575.

BACKGROUND OF THE INVENTION

The present invention generally relates to hand held power tools and more particularly to routers.

Routers are convenient tools that have been used by craftsmen and artisans for decades to perform many woodworking tasks, including cutting decorative shapes and edges in wood and other materials that are conducive to such operations. Routers are generally of two types, fixed base routers and plunge routers. In a fixed based router, the housing is fixed or locked in a position relative to the base after the depth of cut of the tool bit has been set. A plunge router has a housing that is movable relative to a base with the amount of vertical movement being determined by a depth limiting mechanism so that when an operator pushes down on the router to engage the bit into a work surface, it can be locked at the working elevation during operation.

Either type of router can be used free hand by a user or can be mounted to a table and operated in the same manner as a shaper. Many artisans and woodworkers have individual preferences as to the type of router that they wish to use to perform various tasks, and each type of router has its advantages and disadvantages depending upon whether freehand or table mounted operation is being carried out. Some users greatly prefer using a plunge router for freehand use even though they believe that it is more difficult to install and operate in a router table. Some artisans may purchase both types of routers to have a choice depending upon the type of operation that they wish to carry out.

In addition to marketing both types of routers, some manufacturers have developed hybrid routers which have some common components and which can be operated both as a fixed base router and a plunge router. At least one such design has a perfectly cylindrical type motor unit that fits into fixed and plunge router bases, with each of the bases having its own operating handles. In this design, the depth of cut adjustment mechanism has no commonality for each type of router operation and the feel of the tool is somewhat different with each base during operation.

SUMMARY OF THE INVENTION

The present invention is directed to a hybrid router that is capable of operating as a fixed or a plunge router wherein the preferred embodiment thereof comprises a motor assembly that has a housing containing a motor as well as operating handles attached to the housing and operating controls for operating the motor, with the motor assembly can be removably installed in either a fixed base assembly or a plunge base assembly. The preferred embodiment has a rotatable adjustment knob that is located on the motor assembly that can engage the depth adjustment mechanism of either of the fixed or plunge base assemblies. The plunge base assembly has a plunge lock lever that is conveniently located adjacent one of the handles of the motor assembly which contributes to the convenience and common feel of operation regardless of which base assembly is being used with the motor assembly.

The preferred embodiment of the hybrid router also has a motor assembly that has a modern futuristic look where the housing does not have a perfectly cylindrical outer configuration, but which nonetheless fits within each of the base assemblies utilizing clamping mechanisms in conjunction with a cooperative structural configurations that assure the alignment of the motor shaft is accurately perpendicular to the plane of the bottom surface of either of the assemblies.

Another aspect of the preferred embodiment of the present invention lies in the depth control mechanism of the plunge base assembly for establishing a desired depth of cut during a plunge operation, where the depth control mechanism is adapted to easily and conveniently establish a zero position when the tip of the router bit touches the surface upon which the router is resting and to thereafter easily and accurately determine a depth of cut.

DETAILED DESCRIPTION OF THE PREFERRED EMBODIMENT

Figure 3:
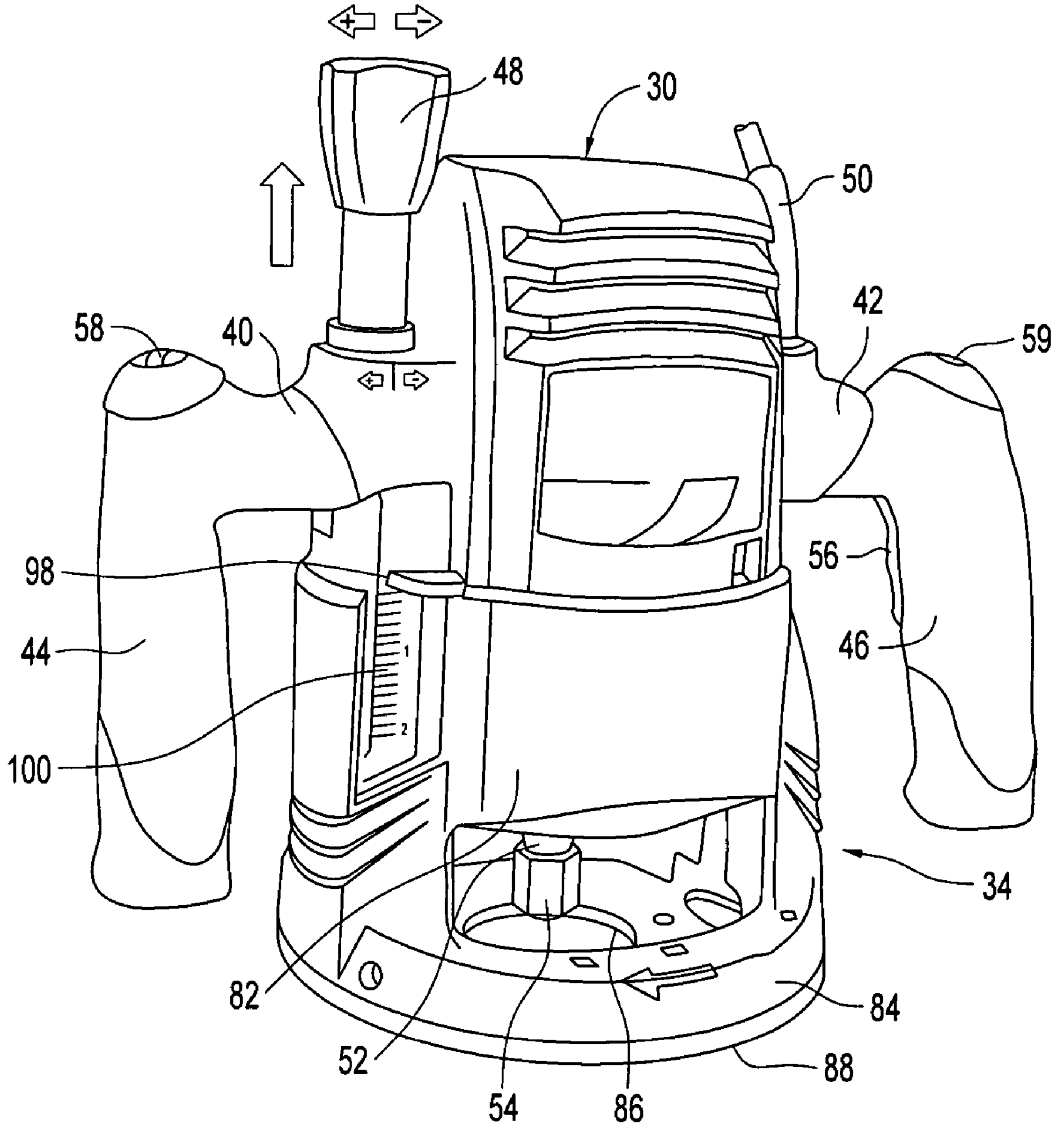
FIG. 3 is a perspective view of the front of the preferred embodiment of the present invention with the motor assembly installed in the fixed base assembly.
Figure 4:
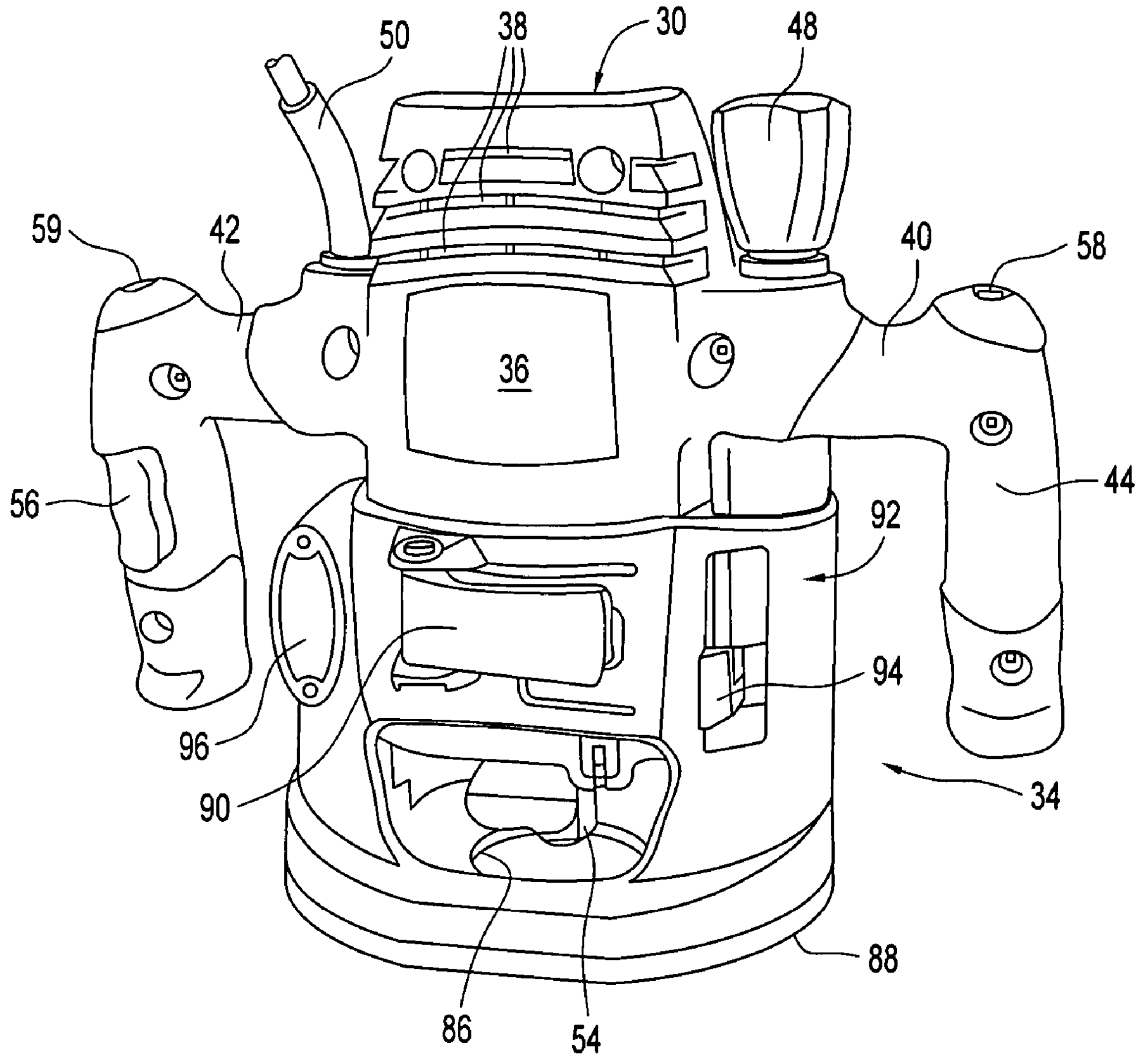
FIG. 4 is a rear view of the router shown in FIG. 3.

Broadly stated, the preferred embodiment of the hybrid router of the present invention comprises a motor assembly that can be installed in either one of a fixed base assembly or a plunge base assembly so that the router can operate either as a fixed router or as a plunge router. Referring to the drawings, FIGS. 1 and 2 illustrate a motor assembly, indicated generally at 30, installed in a plunge base assembly, indicated generally at 32, while FIGS. 3 and 4 show the motor assembly 30 installed in a fixed base assembly, indicated generally at 34.

Figure 1:
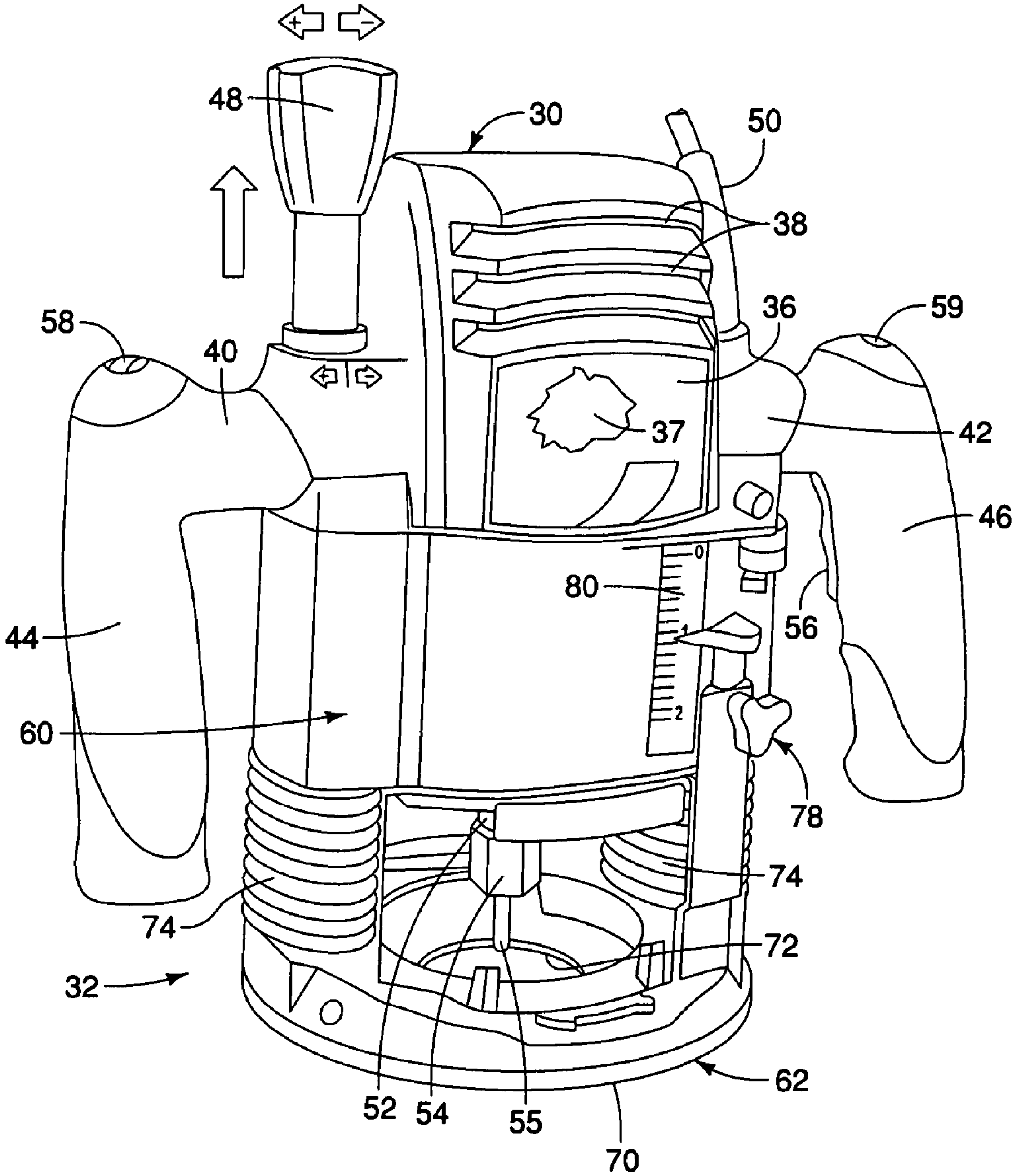
FIG. 1 is a perspective view of the preferred embodiment of the present invention illustrating the motor assembly installed in a plunge base assembly.
Figure 2:
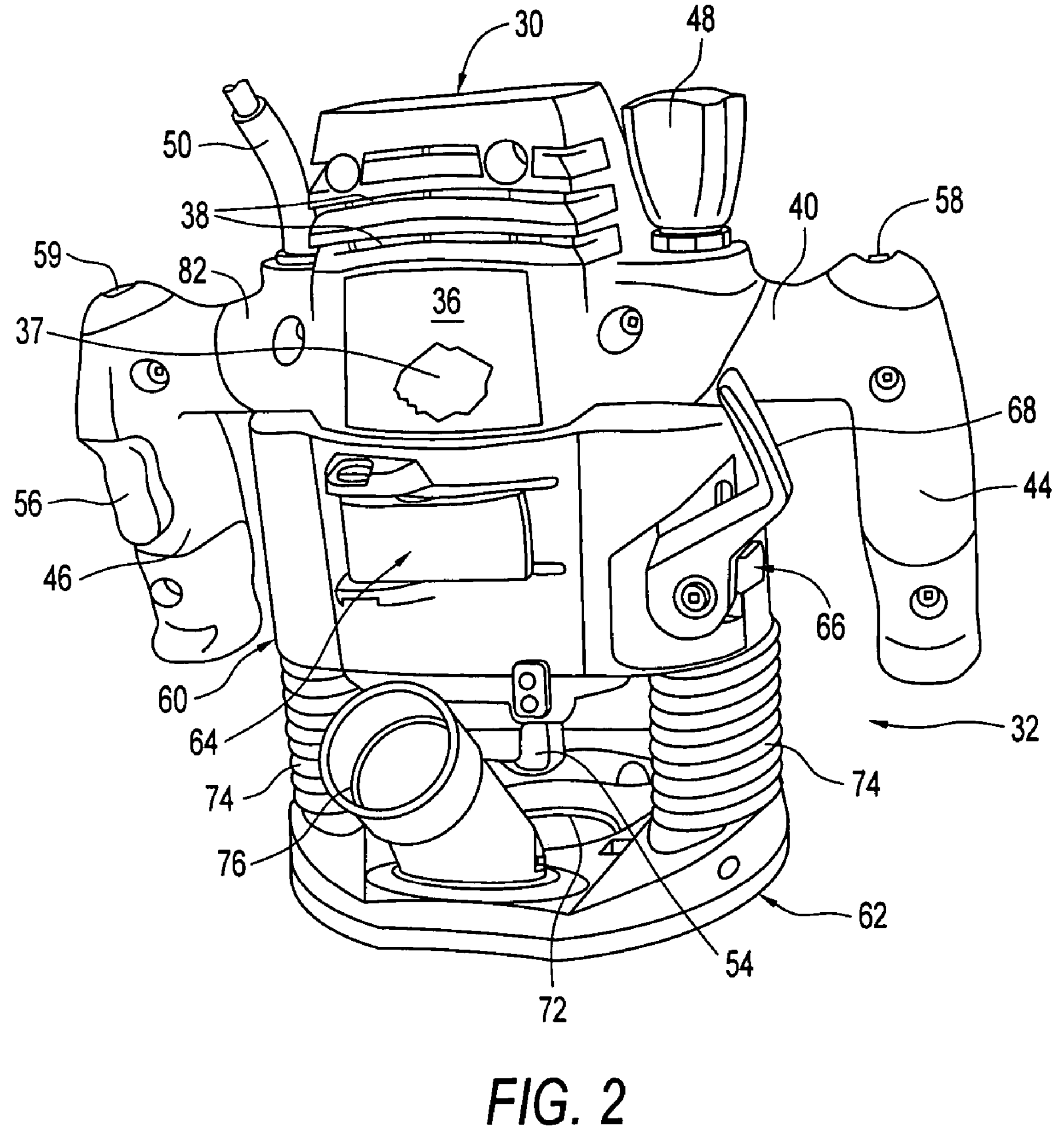
FIG. 2 is a rear view of the router shown in FIG. 1.

With regard to the plunge router shown in FIGS. 1 and 2, the motor assembly 30 has a housing 36 that houses a motor 37 that is ventilated by air vents 38 located in the front and back of the top portion thereof with the housing merging with left and right horizontal handle portions 40, 42 that also merge with generally vertical left and right handle portions 44 and 46. A rotatable pop-up knob 48 is provided on the left horizontal handle portion 40 for providing fine adjustment of the depth of cut of the router when installed in the plunge base assembly 32 and providing the sole depth of cut adjustment when it is also installed in the fixed base assembly 34. A power cord 50 is provided for connection to a source of electrical power. The motor in the housing 36 has an output shaft 52 to which a collet assembly 54 is preferably attached for securing a router bit 55 or other tool to the router during operation. The motor is controlled by an on/off trigger switch 56 located in the right handle 46 and a speed control rotary switch 58 may be provided in the top of the left handle 44. It should be understood that speed variation may or may not be a part of the illustrated router and is not essential to the present invention. A lock-on button 59 may be provided to run the router motor after it has been triggered on without requiring the operator to hold the trigger switch 56 in its depressed position during operation.

The plunge base assembly 32 comprises a motor carrier assembly, indicated generally at 60, and a sub-base assembly, indicated generally at 62, which are vertically movable relative to one another, as is typical with plunge type routers. The motor carrier assembly 60 is constructed to receive the lower portion of the housing 36 of the motor assembly 30 and a motor assembly locking mechanism, indicated generally at 64, securely holds the motor assembly 30 within the motor carrier assembly 60 when the locking mechanism 64 is secured. A plunge locking mechanism, indicated generally at 66, includes a plunge locking lever 68 which operates to selectively lock and release the motor carrier assembly relative to the sub-base assembly so that the router bit can be vertically moved in and out of cutting position as is typical with plunge type routers.

The sub-base assembly 62 has a bottom planar surface 70 that contacts the work piece and it also has an opening 72 through which the bit can pass. The sub-base assembly 62 includes a pair of bellows 74 that surround the posts of the sub-base and shield dust and debris from entering the bellows. The bellows are designed to vertically expand and contract as the motor carrier assembly 60 is vertically moved relative to the sub-base assembly 62. A vacuum port 76 may also be provided.

The plunge lock lever 68 is positioned at the left rear of the motor carrier assembly 60 adjacent the vertical handle portion 44 which is convenient for a user to operate in that the user can easily release the plunge locking mechanism 66 by pulling the handle 44 to the left without removing his hand from the handle 44. An internal spring normally biases the motor carrier assembly away from the sub-base assembly 62. A depth control mechanism, indicated generally at 78, is provided together with a scale 80 to accurately set the depth of cut during a plunge routing operation.

With regard to the fixed base router configuration and referring to FIGS. 3 and 4, the motor assembly 30 is shown installed in the fixed base assembly 34 which has a main carrier casting 82 that includes a sub-base portion 84 in which an opening 86 is provided through which the router bit can extend. A planar bottom surface 88 rests on the work piece or other surface. The motor assembly 30 fits within the carrier casting 82 and a motor assembly locking mechanism, indicated generally at 90, is also provided to secure the motor assembly 30 in the fixed base assembly 34. When the motor assembly is installed in the fixed base assembly, the locking mechanism 90 must be released and when the motor assembly is inserted, a base release locking mechanism, indicated generally at 92, which includes a locking lever 94, engages the motor assembly 30. Thereafter, rotation of the knob 48 will selectively raise or lower the motor assembly 30 relative to the fixed base assembly 34 to adjust the depth of cut of the router bit. When the desired depth is achieved, the motor assembly locking mechanism 90 is then locked and a cutting operation can then be carried out. The fixed base assembly 34 also has a dust port 96.

A depth indicator 98 is provided and moves with the motor assembly as the elevation of the motor assembly is adjusted by rotating the knob 48 and this indicator 98 can be used in conjunction with a scale 100 on the carrier casting 82. The indicator 98 can be moved by the operator preferably to provide an accurate zero indication during setting up the tool. In this regard, if a router bit is installed in the collet assembly 54, the knob 48 can be rotated to an elevation whereby the tip of the router bit is coextensive with the bottom surface 88 or just touching the surface upon which the router rests and at that elevation, the indicator 98 can be physically moved by sliding it to a zero point on the scale 100. Thereafter, the depth of cut can be adjusted by rotating the knob 48 until the desired depth is reached which will be displayed by the indicator relative to the scale 100.

While the foregoing broadly describes the router configuration of FIGS. 1-4, FIGS. 5-24 illustrate the individual components of the major assemblies in more detail and will be more extensively described hereinafter.

Figure 5:
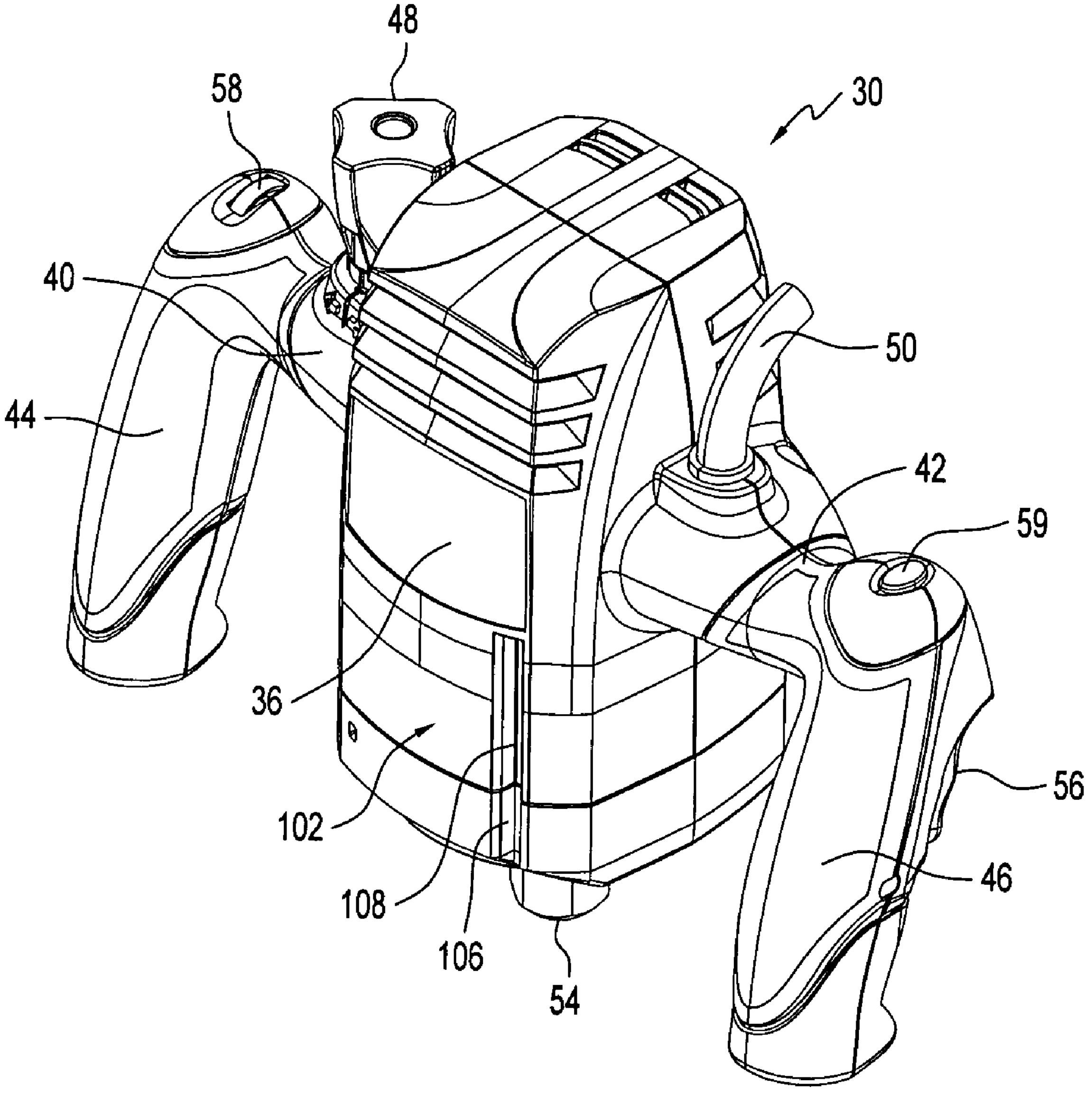
FIG. 5 is a right front perspective of the motor assembly.
Figure 6:
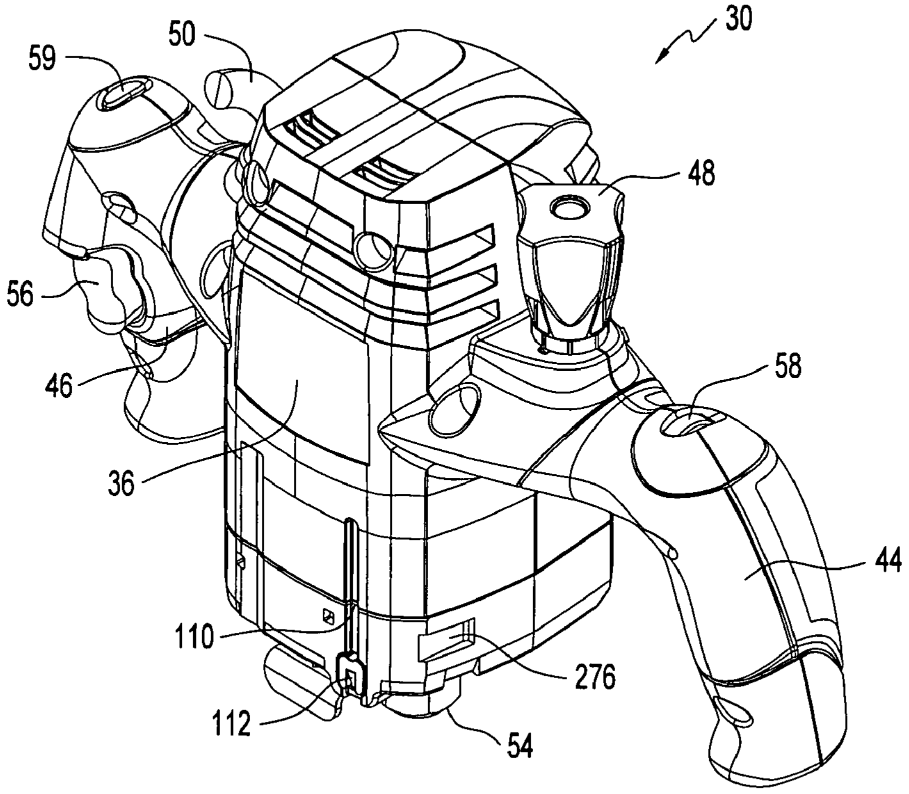
FIG. 6 is a left rear perspective of the motor assembly.
Figure 7:
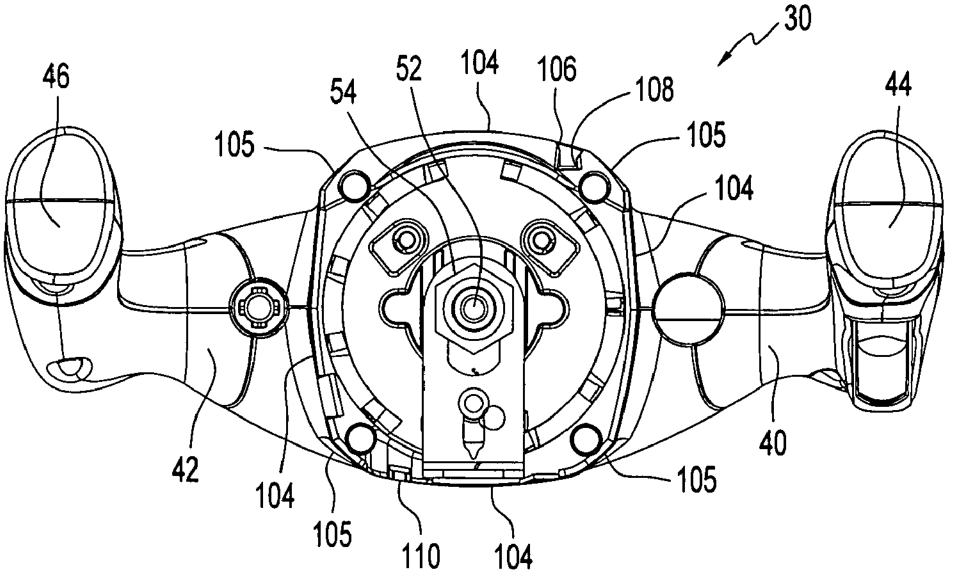
FIG. 7 is a bottom view of the motor assembly.

With regard to the motor assembly and referring to FIGS. 5, 6 and 7, it is apparent that the housing 36 has a contemporary shape that is of a generally square appearance when viewed from above or below. The lower portion of the housing, indicated at 102, is the portion that is inserted in the base assemblies 32, 34 and it has a generally square configuration as shown by the outside walls 104 that are slightly curved in FIG. 7 and which merge with angular corner portions 105. In the lower portion 102, the sidewalls 104 are not perfectly straight in the vertical direction, nor are they perfectly parallel to the axis of the output shaft of the motor. Because of this variation in shape in the vertical direction, it should be appreciated that maintaining the output shaft and therefore the router bit in a relatively perfectly perpendicular orientation to the bottom planar surface of either base assembly is not a simple matter, particularly with regard to the fixed base router configuration where the motor assembly must be capable of being moved vertically relative to the fixed base assembly 34. For that reason and which will be more fully described hereinafter, a recess 106 is provided which extends from the bottom of the motor assembly upwardly throughout most of the lower portion 102 that fits within each base assembly. The recess 106 has a bottom surface 108 that is formed to be relatively perfectly aligned parallel to the axis of the output shaft 52. A raised rail surface on the inside of each base assembly has a surface that engages the bottom surface 108 of the recess 106 and in conjunction with the motor assembly locking mechanism of each base assembly assures proper and accurate alignment of the router bit relative to the bottom surfaces of the respective base assemblies.

A second vertical recess 110 is provided on the left rear wall of the lower portion 102 (See FIG. 6) which also extends approximately the same length as the recess 106. This recess 110 is adapted to retain an inwardly extending pin located on each base assembly 32, 34. When the motor assembly 30 is initially inserted into a base assembly, the pin on the base assembly will engage a base release button 112 causing it to retract inwardly until the pin clears the button 112, at which point the button will snap outwardly back to its original position. Thereafter, if the motor assembly is to be removed from a base assembly, a base release actuator (to be described later) on each base assembly will depress the base release button 112 enabling the pin to clear the button and permit the motor assembly to be removed from the base assembly. This base release button thereby prevents the motor assembly from being removed unless removal is desired and also prevents either of the bases from falling off of the motor assembly 30 in conditions where all other locking mechanisms have been released.

Figure 8:
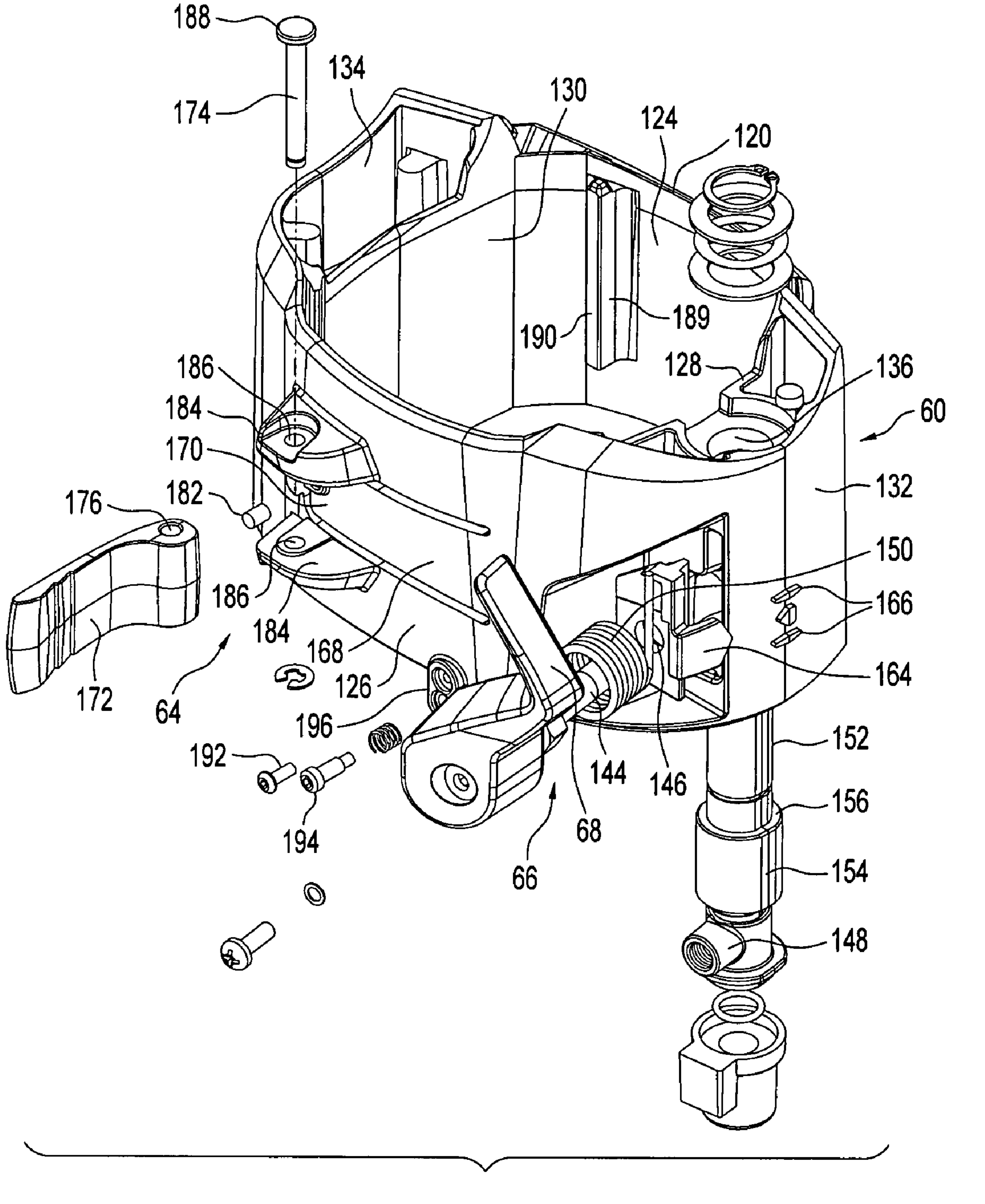
FIG. 8 is a left rear perspective of the motor carrier assembly portion of the plunge base assembly, and shown partially exploded.
Figure 9:
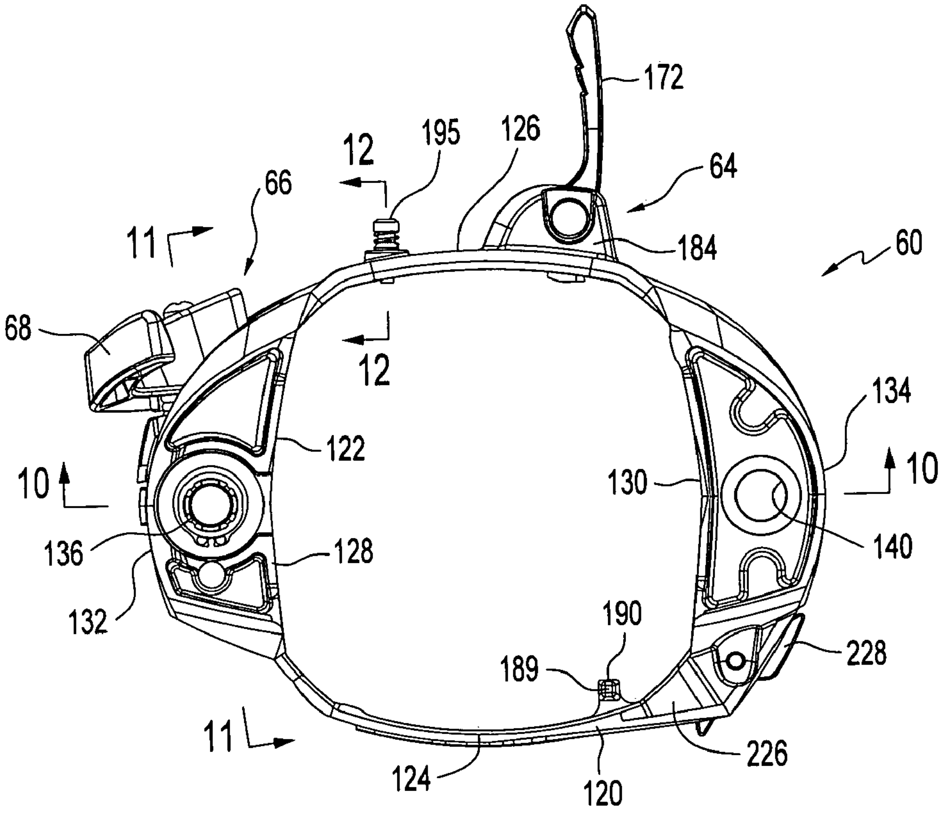
FIG. 9 is a top view of the motor carrier assembly.
Figure 10:
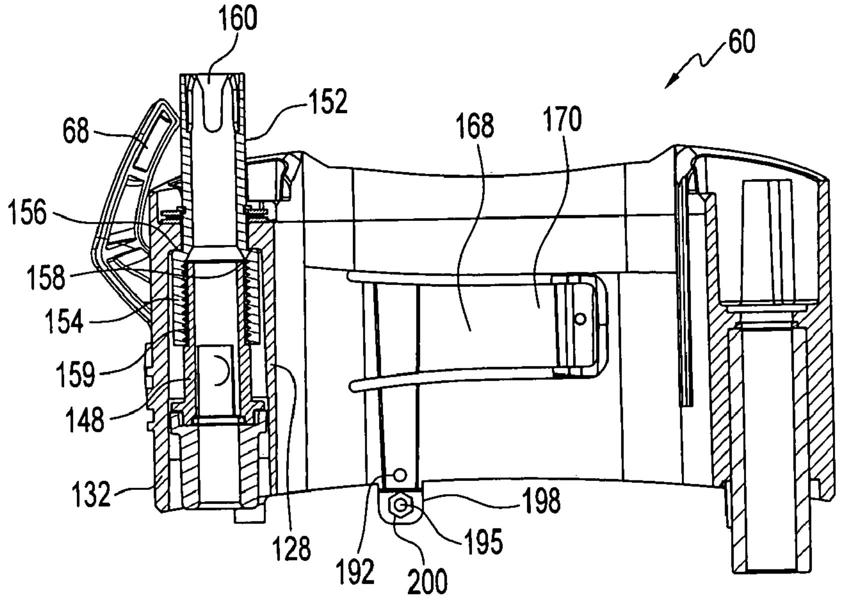
FIG. 10 is a cross-section of the motor carrier assembly taken generally along the line 10-10 in FIG. 9.
Figure 11:
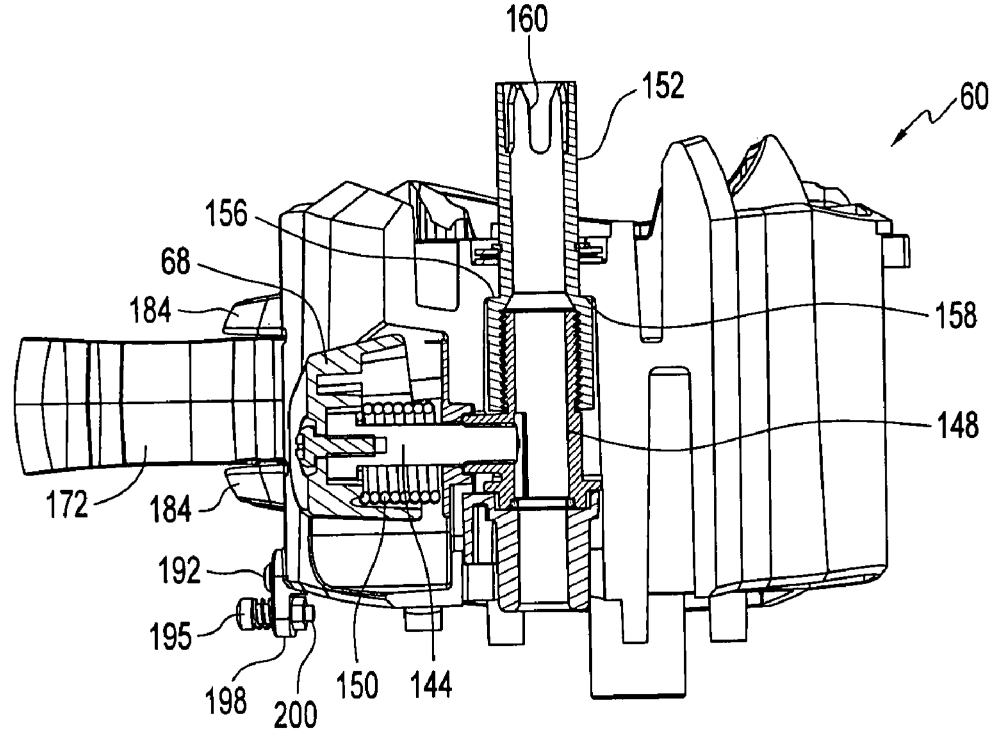
FIG. 11 is a cross-section of the motor carrier assembly and is taken generally along the line 11-11 of FIG. 9.
Figure 12:
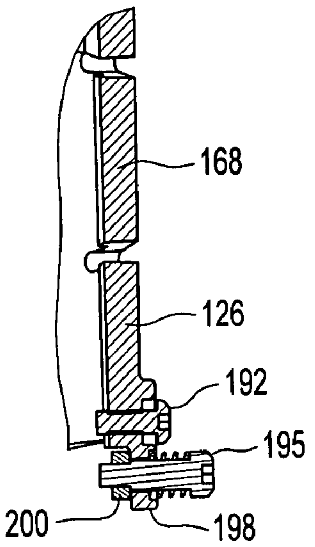
FIG. 12 is a cross-section of the motor carrier assembly and is taken generally along the line 12-12 of FIG. 9.

The motor carrier assembly 60 which is part of the plunge base assembly 32 is shown in detail in FIGS. 8-13. As best shown in FIGS. 8 and 9, the motor carrier assembly 60 includes a motor carrier casting 120 that has an internal opening 122 that has a configuration that is very similar to the outer configuration of the lower portion 102 of the motor assembly in that it has curved walls and corner configurations that are substantially similar to the outer walls 104 and corners 105 of the motor assembly as shown in FIG. 7. The casting 120 has a front wall 124, a rear wall 126, inner left and right side walls 128 and 130, respectively, as well as left outer wall 132 and right outer wall 134. There is structure between inner and outer walls 128 and 132 which define an opening 136 in which a left post 138 that is secured to the sub-base assembly 62 is located (see FIG. 17). Similarly, structure between the right inner wall 130 and outer wall 134 define an opening 140 in which a right post 142 is located.

With regard to the plunge locking mechanism 66, it has the plunge lock lever 68 attached to a threaded rod 144 that extends through an opening 146 and is threaded through a fitting 148 to engage the left post 138. When the lever 68 is moved in the clockwise direction as shown in FIG. 8, the rod 144 is moved out of engagement with the post 138 and thereby releases the motor carrier assembly 60 so that it can move vertically relative to the sub-base assembly 62. A spring 150 biases the lever 68 into a normally locking position. The mechanism also includes a hollow cylindrical post fitting 152 that has an enlarged lower portion 154 which defines an annular flange 156 that engages a corresponding annular flange 158 formed in the structure between the inner and outer walls 128 and 132. The interior surface 159 of the enlarged portion 154 is threaded and mates with an outside threaded portion of the fitting 148. The inside of the top of the post fitting 152 has a number of recesses 160 which are designed to engage complementary raised structure provided on a cylindrical end portion 162 of the knob 48. An indicator 164 is provided and has a pointed end which is located adjacent raised indicia 166 which define the extent of adjustment that can be made by rotating the knob 48 without releasing the plunge locking mechanism 66. This is achieved by rotation of the post fitting 152 relative to the fitting 148 with the two components being threadably engaged so that rotation of the fitting 152 will cause the fitting 148 to move vertically relative to the sub-base 62 including its post 138 to which the locking mechanism 66 is locked onto. When the limited movement that is permissible between the spaced indicia 166 occurs, the lever 68 and the other components that are connected to it will similarly move the small amount relative to the motor carrier casting 122. The mechanism is secured together in the motor carrier casting 120 by suitable washers, snap rings or the like as shown and which are known to those of ordinary skill in the art.

Figure 13:
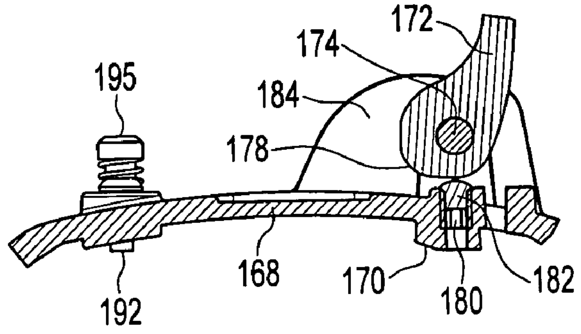
FIG. 13 is a cross-section of the motor carrier assembly and is taken generally in the direction of lines 13-13 of FIG. 9, and which is taken generally along the line 13-13 of FIG. 14.
Figure 14:
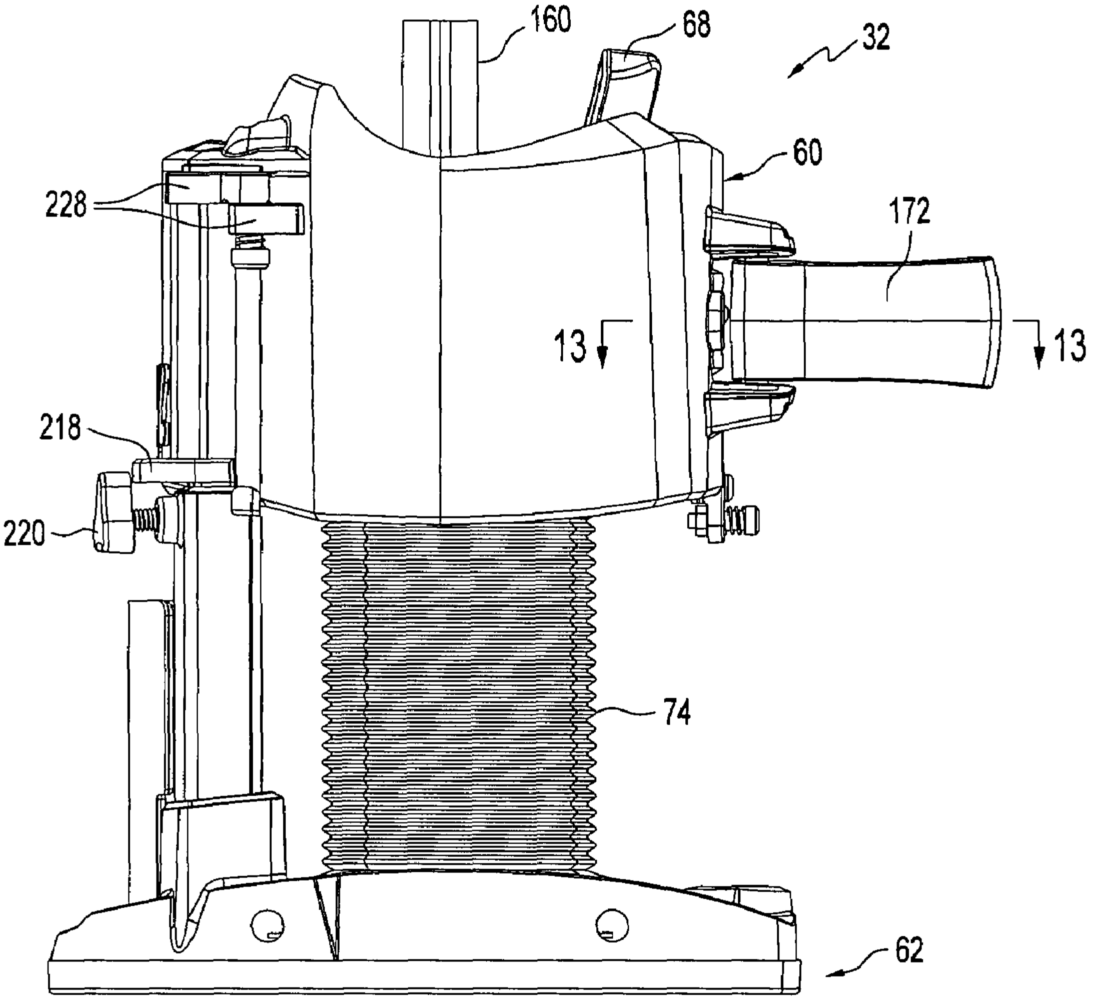
FIG. 14 is a right plan view of the plunge base assembly.
Figure 15:
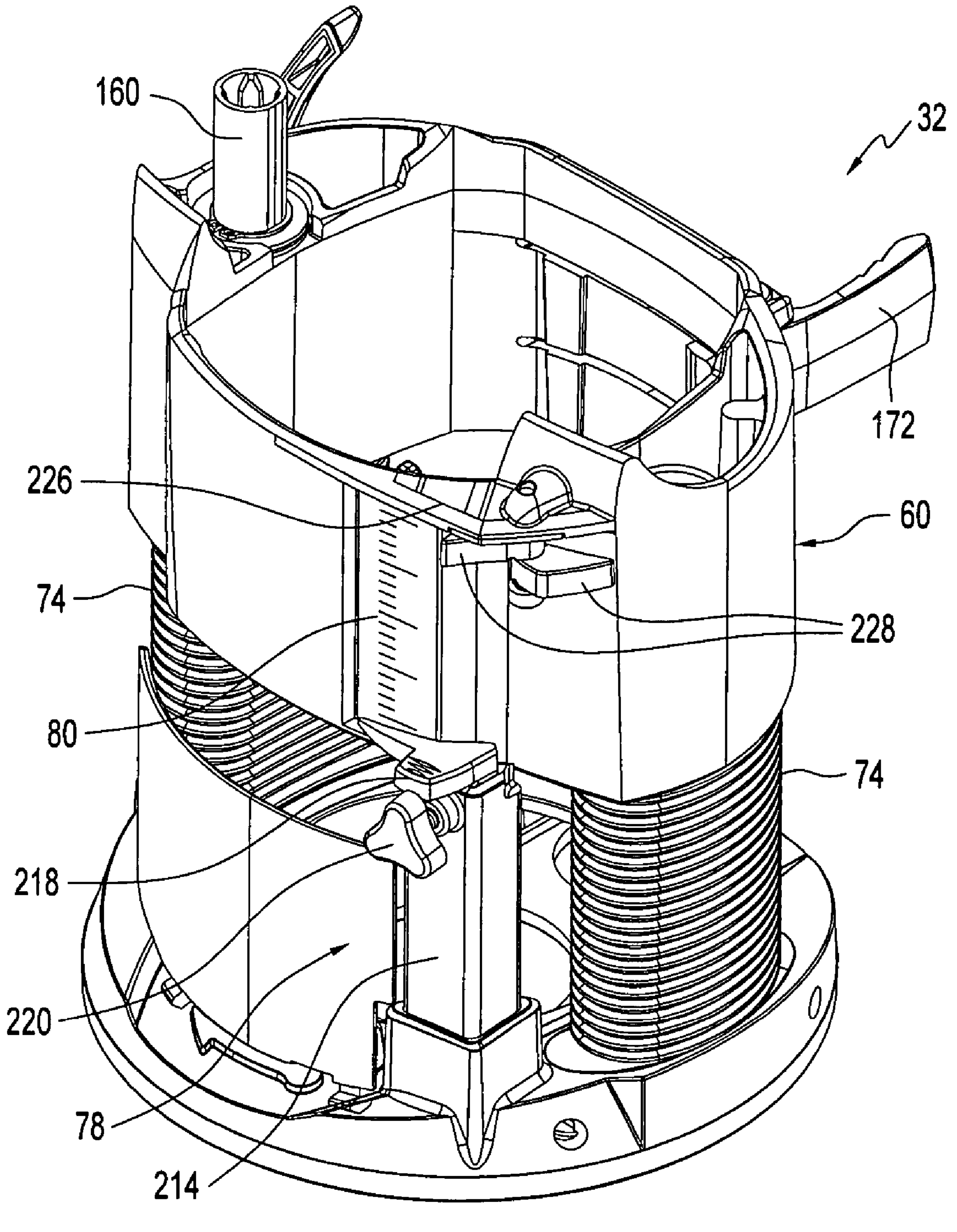
FIG. 15 is a right front perspective of the plunge base assembly shown in its extended position.
Figure 16:
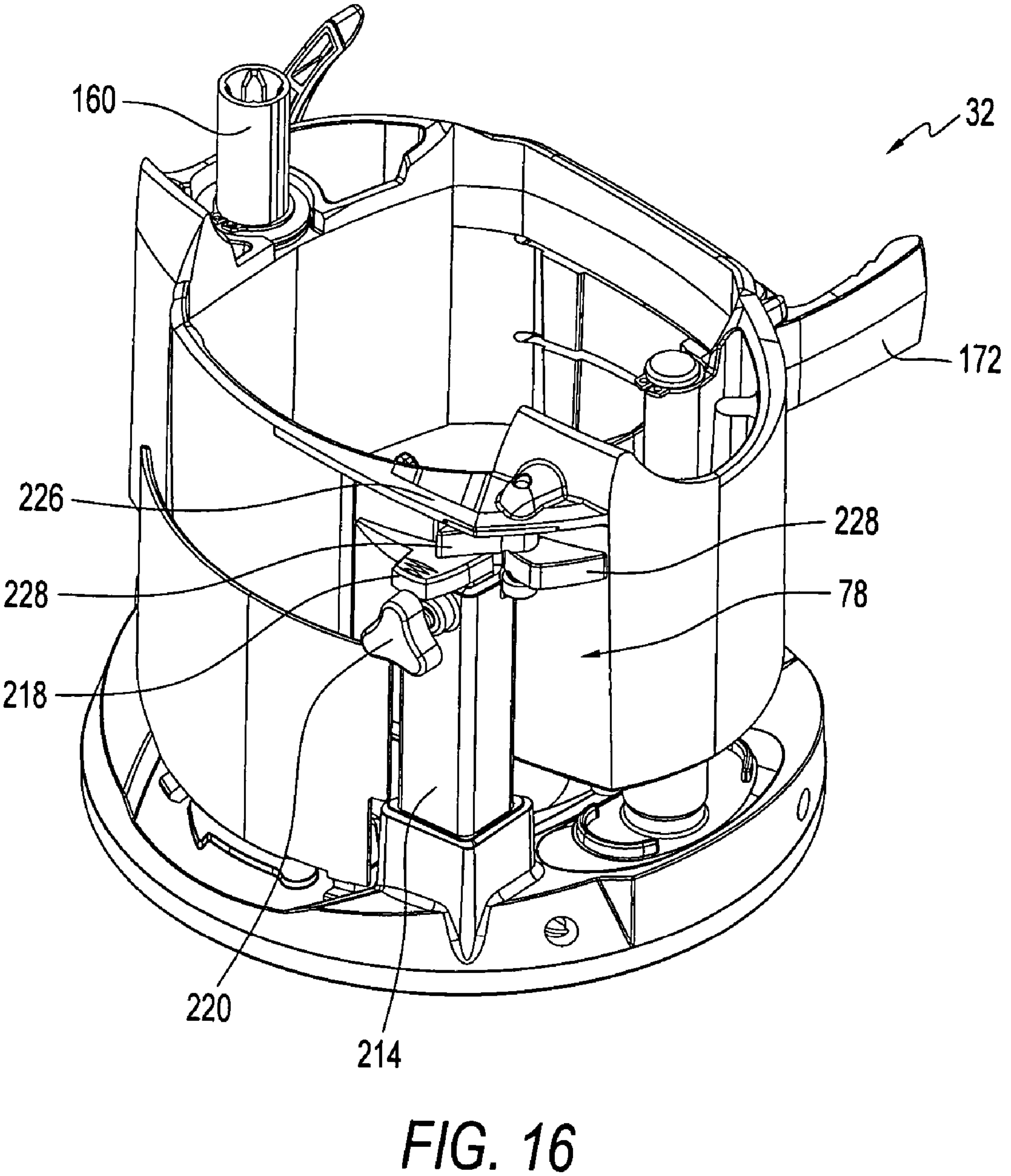
FIG. 16 is a right front perspective of the plunge base assembly shown in its lower plunged position.

To secure the motor assembly 30 in the motor carrier assembly 60, the motor assembly locking mechanism 64 provides a clamping force applied to the rear wall 126. The clamping mechanism 66 is comprised of a live hinge 168 that is formed in the rear wall 126 by removing material from the wall around the periphery thereof or by defining the live hinge during the casting operation. The hinge 168 has a free end 170 that can be deflected inwardly by a motor assembly clamp lever 172 when it is moved between an unlocked position as shown in FIGS. 8, 9 and 13 to a locked position as shown in FIG. 2. The clamp lever 172 pivots around a pin 174 that extends through an opening 176 at the pivoting end thereof. The pin 174 has a cam end surface 178 as best shown in FIG. 13 which contacts a set screw 180 that has a nylon or similar end cap 182 that fits within the set screw 180 and which is contacted by the cam surface 178. As the clamp lever 172 is rotated in the counterclockwise direction as shown in FIG. 13, the distance from the pin 174 increases gradually which causes the free end 170 of the live hinge 168 to move inwardly or downwardly as shown. The amount of movement of the free end 170 can be adjusted by rotating the set screw 180 which is threadably engaged in an opening therein. The pin 174 is secured in a pair of outwardly extending mounts 184 that have openings 186 therein through which the pin 174 can be inserted. The pin 174 has an enlarged head 188 and it can be secured by an e-clip or similar locking means. It should be understood that the mounts 184 may be cast in place when the motor carrier casting is made or may be suitably attached by other means.

As best shown in FIGS. 8 and 9, when the free end 170 of the live hinge 168 is moved inwardly pursuant to the clamp lever 172 being moved to its locked position, the motor assembly is biased toward the front wall 120. As previously alluded to, a raised rail 189 is provided which has a top surface 190 that is designed to fit within the recess 106 of the motor assembly (see FIG. 5). The top surface 190 engages the bottom surface 108 of the recess 106 and by virtue of the fact that the rail 189 is oriented to be parallel to the axis of the motor output shaft as well as perpendicular to the bottom surface 70 of the sub-base assembly 62, the correct alignment of the motor assembly relative to the bottom surface of the sub-assembly is assured.

The motor carrier assembly 60 also has provision for preventing separation of the motor assembly 30 from the motor carrier assembly 60 when the locking mechanism 64 is in its unlocked position. In that state, the motor assembly can be freely moved relative to the motor carrier assembly 60 and would potentially separate from the motor carrier assembly were it not for the previously mentioned recess 110 and base release button 112 located near the bottom of the rear wall of the motor assembly 30 (see FIGS. 6 and 7) that is contacted by a stop pin 192 provided in the motor carrier assembly 60. This inwardly protruding stop pin 192 is provided and is located above a base release actuator 194 that is spring biased away from the wall 126. The base release actuator 194 is in the form of a shoulder screw with a spring located outside of it, with the shoulder screw sliding freely in a hole 196 located in a downwardly extending flange 198, with the actuator being secured by a nut 200 attached to the other end of the shoulder screw 195. When the motor assembly is inserted in the motor carrier assembly, the stop pin 192 will depress the base release button

112 as it is being inserted and when the pin 192 clears the button 112, it is in the position to prevent sliding removal of the motor assembly from the motor carrier assembly 60 unless and until the base release actuator 194 is depressed to depress the base release button 112 so that the pin 192 can clear the base release button 112 during removal of the motor assembly.

Figure 17:
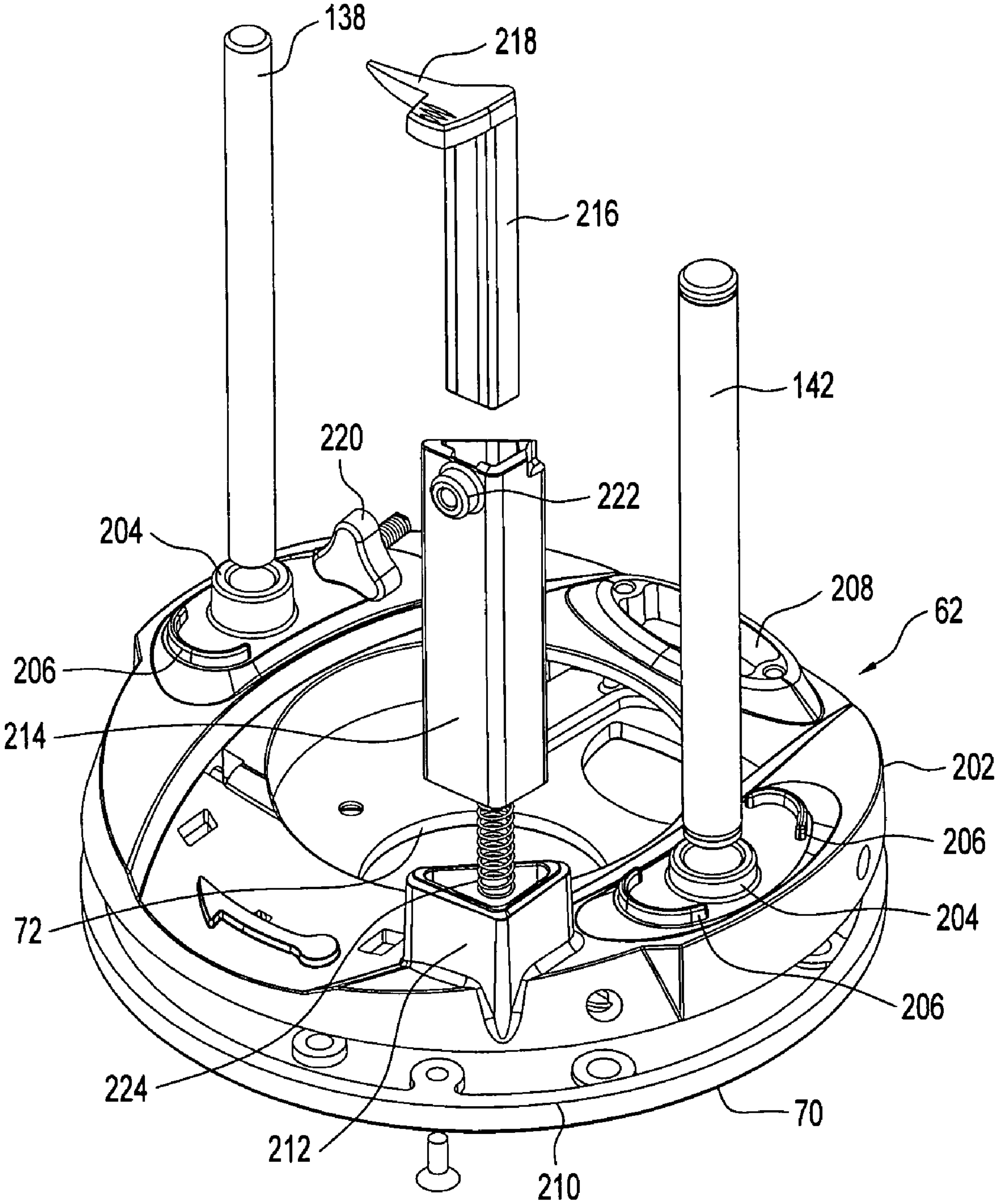
FIG. 17 is a perspective view of the sub-base structure of the plunge base assembly and particularly illustrating a major portion of the depth control mechanism.
Figure 18:
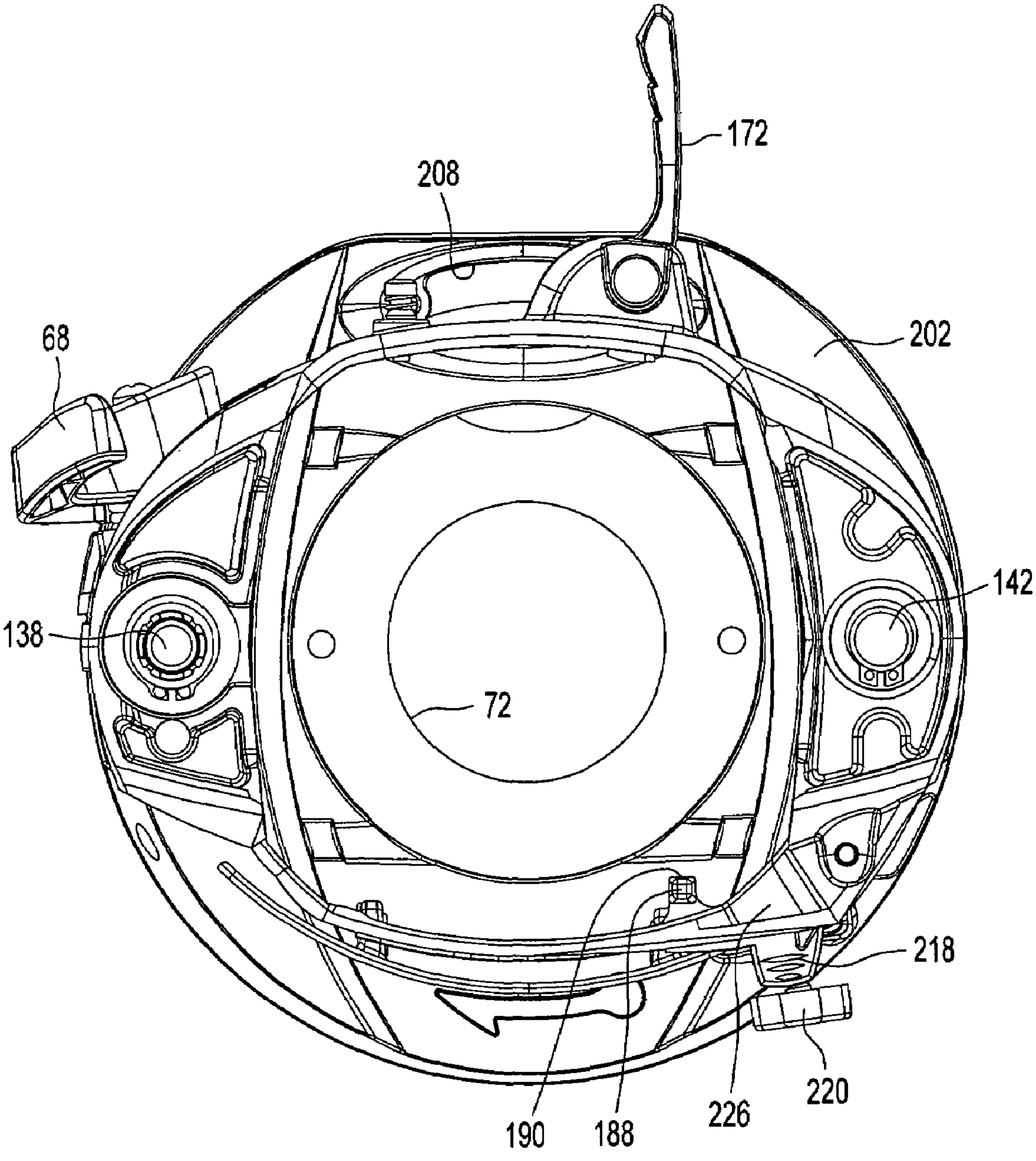
FIG. 18 is a top view of the plunge base assembly.
Figure 19:
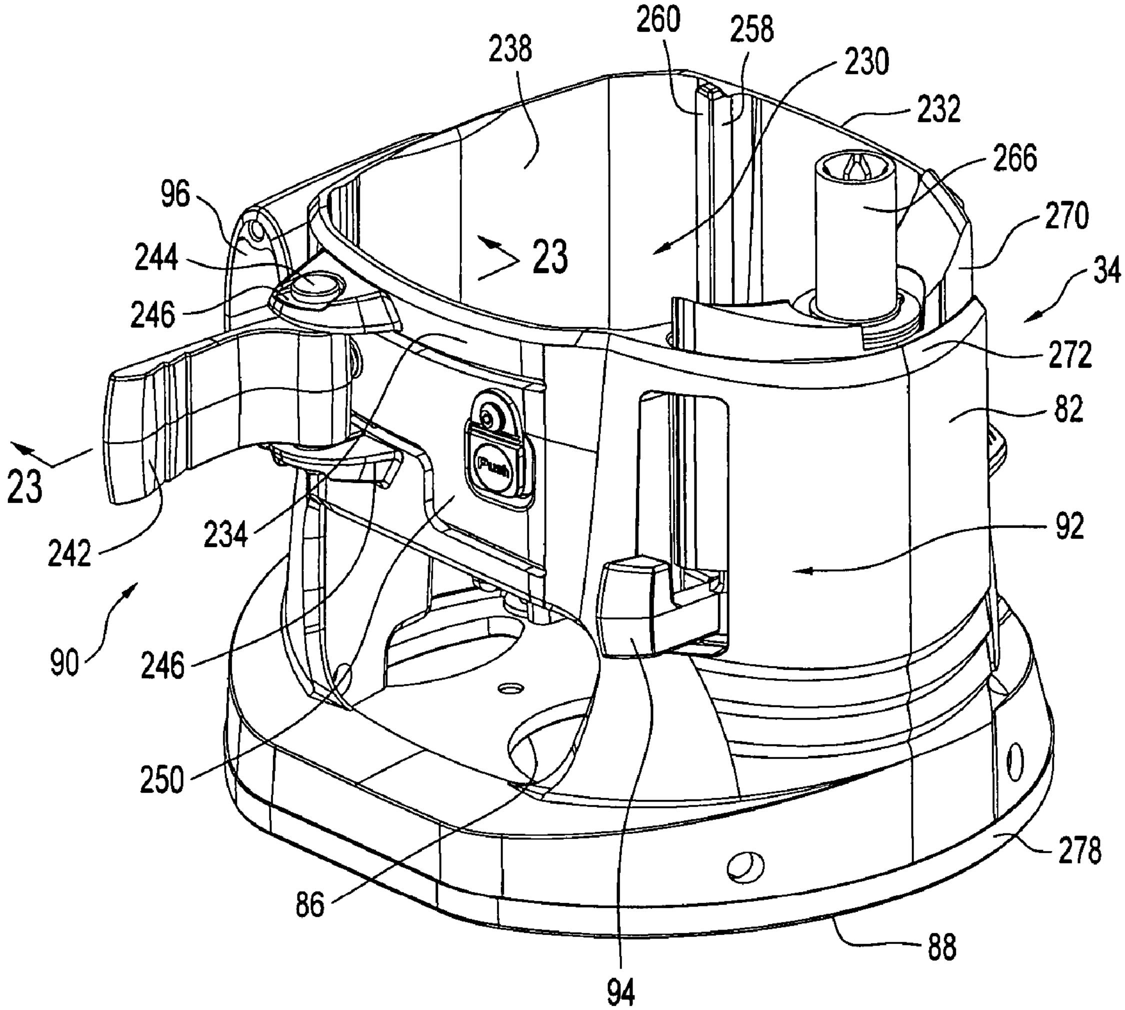
FIG. 19 is a rear perspective of the fixed base assembly.
Figure 20:
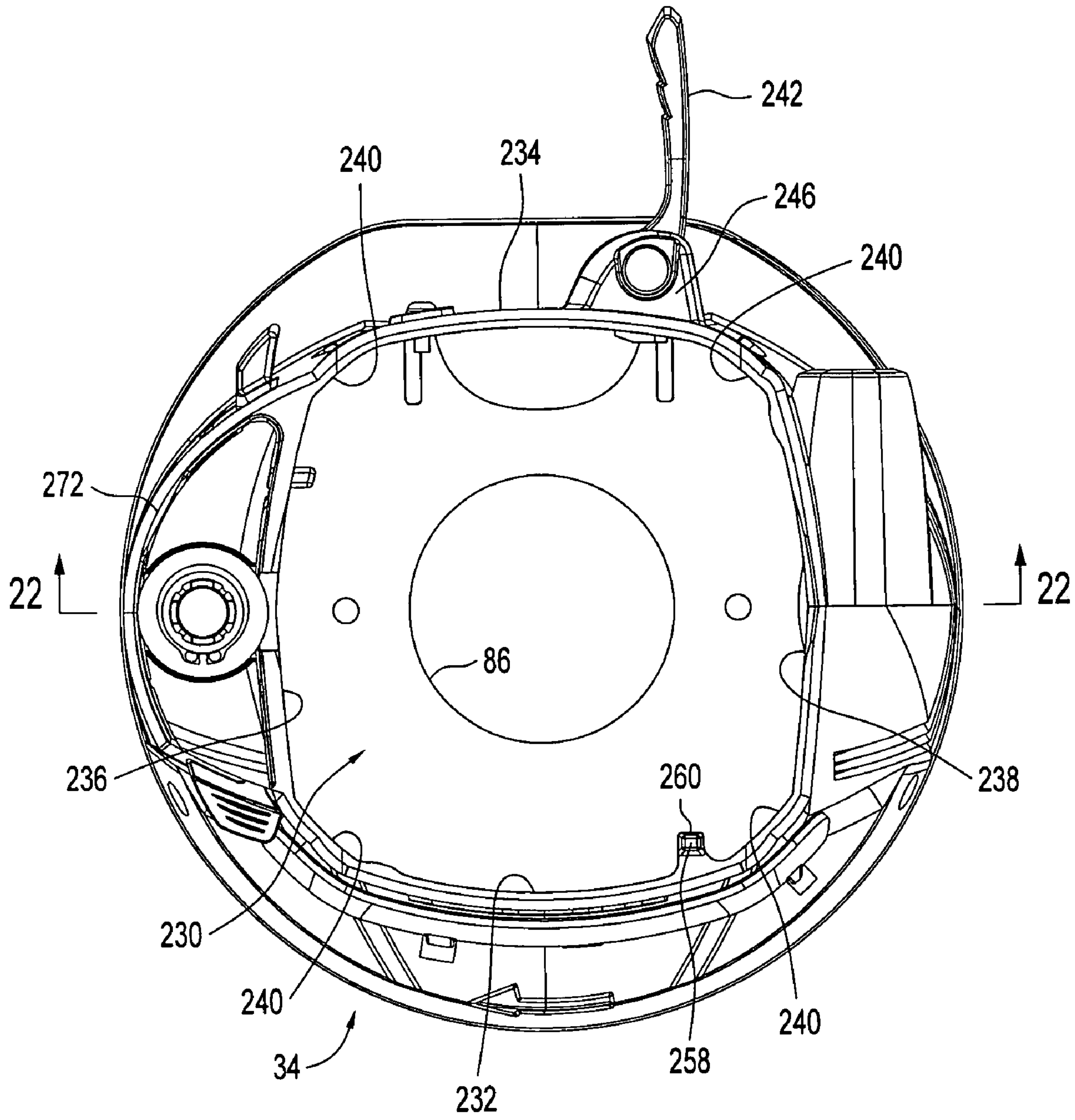
FIG. 20 is a top view of the fixed base assembly.
Figure 21:
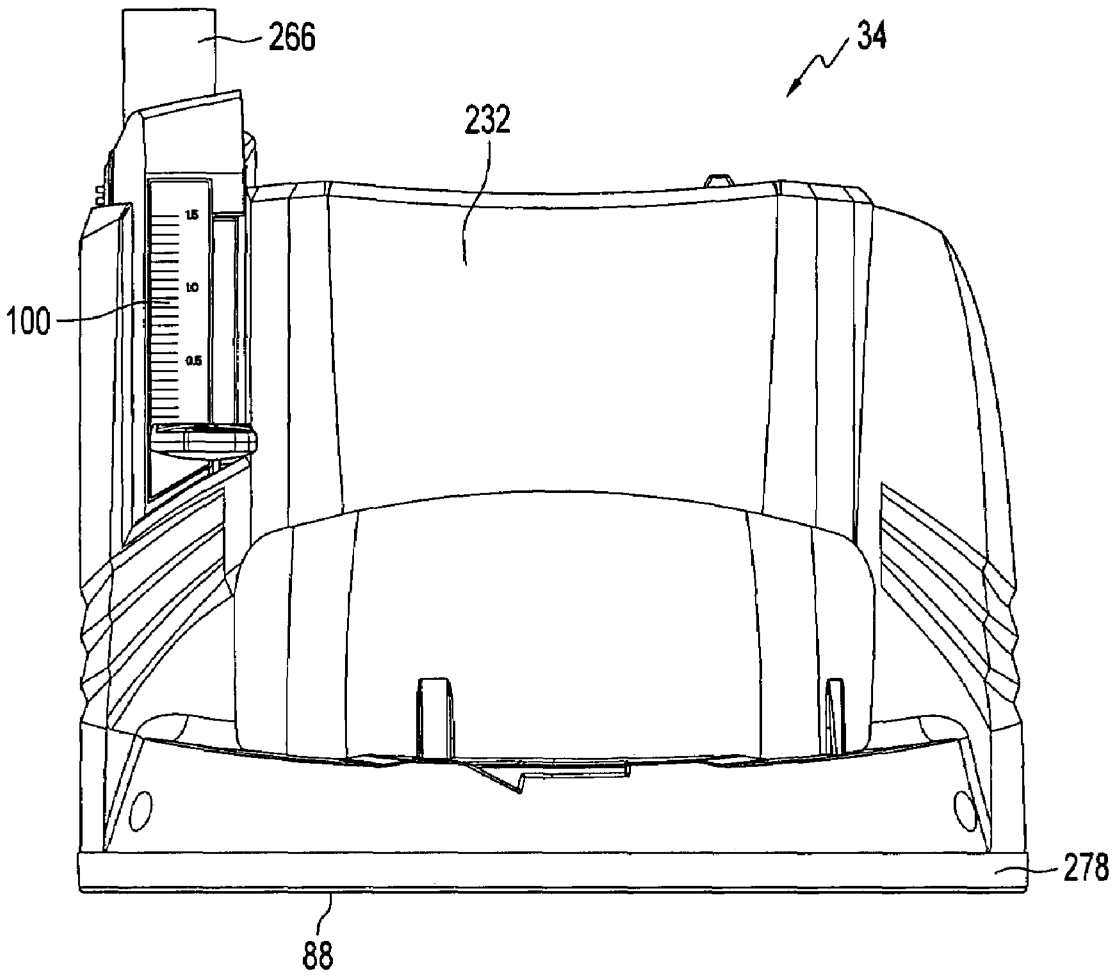
FIG. 21 is a front plan view of the fixed base assembly.
Figure 22:
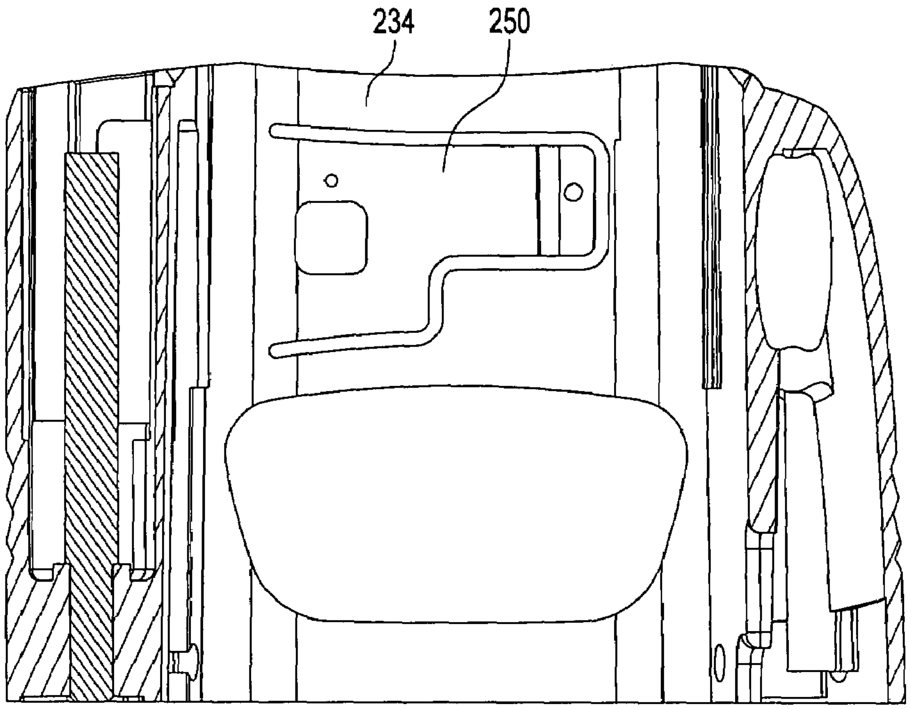
FIG. 22 is a cross-section of the fixed base assembly with portions removed, taken generally along the line 22-22 of FIG. 20.

The plunge base assembly 32 comprises the above-described motor carrier assembly 60 which is installed onto the sub-base assembly 62 shown in FIG. 17. This includes a casting 202 which includes circular extensions 204 which are appropriately sized to receive the posts 138 and 142. Semi-circular extensions 206 are provided adjacent the extensions 204 to provide a guide for placement of the bellows 74 that are generally oval shaped as shown in FIGS. 1, 2, 14 and 15. A dust port 208 is provided and communicates with the area near the location where the router bit would be and it is configured to receive the vacuum extension 76 shown in FIG. 2. A bottom plate 210 is provided and made of a material that will easily slide over a work piece, particularly a wood work piece, without scratching the work piece. Importantly, the sub-base assembly 62 has a triangular extension 212 in which an elongated triangular cross-sectionally shaped indicator tube 214 is preferably press fit, in which an indicator post 216 is inserted. The indicator post 216 has a pointed preferably flat topped end portion 218 which can cooperate with a scale 80 (see FIG. 1) for the purpose of accurately determining and controlling the depth of cut of a router bit. The indicator post 216 can be secured in an appropriate position by an indicator knob 220 that screws into a threaded boss 222 located in the indicator tube 214. By tightening the knob, the position of the indicator post can be set. A spring 224 is located within the indicator tube for biasing the indicator post 216 in the upward direction.

When the sub-base assembly 62 is assembled with the motor carrier assembly, the plunge base assembly 32 is completed and is illustrated in FIGS. 14, 15, 16 and 18. The plunge base assembly is shown in its most extended position in FIG. 15 and is shown generally fully plunged in FIG. 16. When the sub-base assembly and motor carrier assembly are assembled together, the pointed end portion 218 of the indicator post 216 is in position to have its top surface contact a horizontal outwardly extending flange 226 as shown in FIGS. 1, 14, 15 and 16.

To lower the cutting bit, the plunge lock lever 68 is moved to the right as shown in FIG. 2, or away from the motor carrier assembly 60 to unlock the locking mechanism, then apply downward pressure until the desired depth is reached whereupon pressure on the lever 68 is released which locks it in that position. The plunge lock lever 68 is spring loaded and returns automatically to the locked position. To raise the router, again push the plunge lock lever to release it and release pressure on the router and the router will automatically retract the bit from the work piece since it is spring loaded and biased upwardly from the sub-base assembly 62. Although the springs are not illustrated, they are located inside of the bellows 74 around the posts.

To determine and control the depth of cut, the user will install a router bit in the collet assembly 54, loosen the indicator knob 220 if it is not loose and gently lower the motor carrier assembly until the tip of the router bit contacts the level surface the router is sitting on, whereupon the plunge lock lever 68 is released to lock that position. Since the indicator post 216 is spring biased upwardly, it will rise until the end portion 218 contacts the flange 226, whereupon the indicator knob 220 is tightened. This is the zero position from which further depth adjustments can be accurately made. To set a desired depth of cut, the indicator knob is again loosened, and the pointed end pointer 218 is then lowered to the required depth using the scale if desired and then tightening the depth indicator knob 220 when the desired depth of cut has been reached. During a routing operation, it is then only necessary to plunge the router downwardly until the flange 226 comes in contact with the end portion 218.

If a deep cut is to be made, it is known to artisans that several progressively deeper cuts is often desirable. The depth control mechanism 78 conveniently includes a pair of turret elements 228 which have a predetermined thickness and which can be selectively rotated in and out of contact with the pointed end portion 218. It is preferred that the elements have a thickness of approximately ¼" so that successive cuts can be made in ¼" intervals until the desired depth of cut is ultimately achieved.

Returning to the fixed base configuration shown in FIGS. 3 and 4, the fixed base assembly 34 is shown in FIGS. 19-24. The fixed base assembly has the carrier casting 82 that is similar to the plunge router casting 120 in several respects, including the presence of an internal opening in which the motor assembly 30 can be inserted, with the configuration of the opening 230 also being of the same general shape as the outer configuration of the lower portion 102 of the motor assembly 30. More particularly, the casting 82 has a thin front wall 232, a relatively thin rear wall 234, an inner left wall 236, and a right wall 238. The inside surfaces of each of these walls are slightly curved and merge with corner portions 240 (best shown in FIG. 20) that conform with the shape of the motor assembly.

Figure 23:
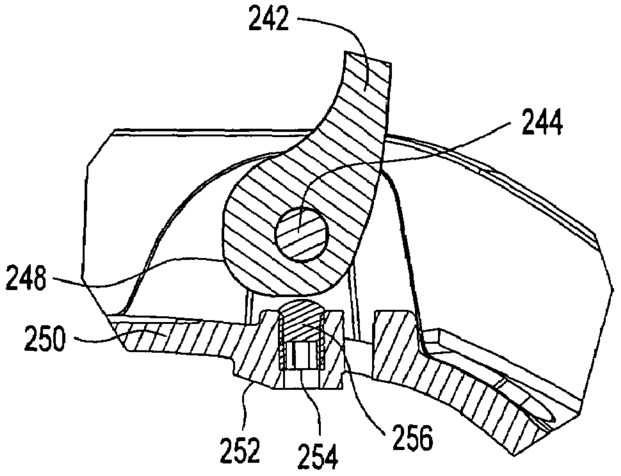
FIG. 23 is a cross-section of a portion of the fixed base assembly and taken generally along the line 23-23 of FIG. 19; and, FIG. 24 is a is a left rear perspective of the fixed base assembly, and shown partially exploded.
Figure 24:
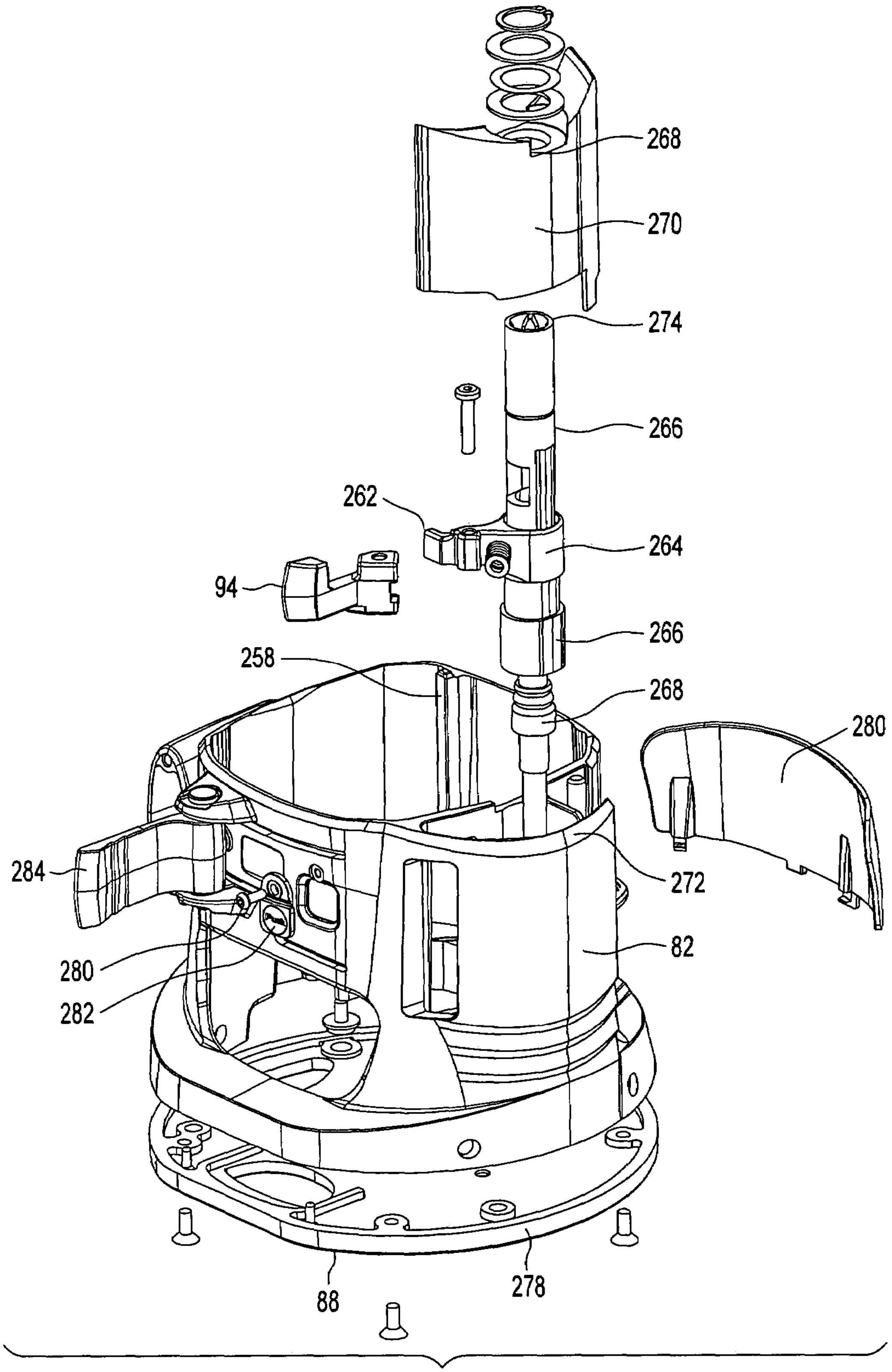

In a manner substantially similar to the plunge base assembly, the fixed base assembly 34 has the motor assembly locking mechanism, indicated generally at 90, which includes a clamp lever 242 that pivots around pin 244 that is secured in mounts 246. As shown in FIG. 23, the end of the clamp lever 242 has a cam surface 248 that engages a live hinge 250, near its free end. The cam surface 248 is configured to move the free end 252 inwardly to bear against the housing portion 102 of the motor assembly 30 for holding the same in the fixed base assembly 34. A set screw 254 having a preferably nylon insert 256 is provided with the set screw being adjustable relative to the cam surface 248 to adjust the degree of deflection that is provided when the clamp lever 242 is placed in its locking position. The casting 82 also has a vertical rail 258 with a top surface 260 that engages the recess 106 in the motor assembly 30, with the top surface 260 engaging the bottom surface 108 of the recess 106. As previously discussed with regard to the plunge router configuration, the rail 258 assures that the motor assembly will be oriented in relatively accurate alignment so that the output shaft of the motor will be relatively perfectly normal to the bottom surface 88 of the fixed base assembly 34. Because the top surface 260 as well as the bottom surface 108 of the motor assembly are relatively smooth, adjustment of the depth of cut of the router bit that is determined by the vertical position of the motor assembly relative to the fixed base assembly 34 requires sliding relative movement of the two components.

When the motor assembly 30 is inserted into the fixed base assembly 34, it slides downwardly until it engages the base release locking mechanism 92 which includes the base release lever 94 that controls a locking tab 262 (See FIG. 24) that is connected to a rotatable fitting 264 that rotates around a post fitting 266. The fitting 264 is spring biased so that the tab 262 is urged inwardly into the opening 230. The post 266 is threaded to a rod 268 that is secured to the base casting 82. The post 266 also fits within an opening 268 in a top guide fitting 270 that fits within a similarly configured opening between the inner right wall 236 and the outer wall 272. During operation, the fitting 270 as well as the post 266, fitting 260, tab 262 and lock lever 94 all move vertically depending upon the direction of rotation of the post fitting 266 and the knob 48 of the motor assembly engages the top of the fitting 266. In this regard, the cylindrical end 162 of the knob 48 has recesses 274 configured in the interior thereof that are the same as the recesses 160 in the plunge post fitting 152 so that the knob will rotate the post 266 during operation.

When the motor assembly 30 is initially inserted into the fixed space assembly 34, the lower portion 102 of the housing will contact the locking tab 262 and force it outwardly so that the housing can be inserted. When it has reached an appropriate depth, the locking tab 262 will engage a recess 276 (see FIG. 6) and thereby hold the motor assembly at that particular location. Thereafter when the knob 48 is rotated, the motor assembly will be moved either upwardly or downwardly relative to the casting 82 depending upon the direction of rotation. As with the plunge base assembly, a bottom plate is preferably attached to the casting 82 and is made of similar material to the bottom plate 88 of the plunge base assembly 32. A protective preferably transparent shield 280 may be provided to protect the user from flying debris during operation.

To adjust the depth of cut of the router when being used with the fixed base 34, the clamp lever 242 is released and the knob 48 can be rotated to move the motor assembly 30 (and necessarily the router bit) relative to the fixed base assembly 34. When the correct depth of cut is reached, the clamp lever 242 can be placed in its locked position. Because the depth of cut variation may extend at least a few inches, the recess 110 in the motor assembly is of approximately the same length so that the stop pin 280 can ride up and down within the slot 112 and will not hinder the depth of cut adjustment.

To remove the motor assembly 30 from the fixed base 34, the clamp lever 242 is released and lock lever 94 is rotated to the right so that the locking tab 262 is separated from the recess 276 of the motor assembly thereby enabling the motor assembly to be lifted from the base. However, the fixed base assembly also has a stop pin 280 and base release actuator 282 that are substantially similar to the stop pin and base release actuator 192 and 194 of the plunge base assembly and operate in the identical manner as has been previously described. When the base release actuator 282 is depressed, then the motor assembly can be completely removed from the fixed space assembly 34.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A plunge router comprising:

a base structure having a pair of spaced vertical guide posts along which a housing is vertically moveable;

a housing containing a motor for driving an output shaft to which a bit holding mechanism is capable of being attached, a plunge locking mechanism for holding said housing at a particular vertical position along said guide posts;

a depth control mechanism for establishing a when said housing is vertically moved toward said base structure, said mechanism comprising;

an elongated support member attached to said base structure;

a vertically oriented elongated indicator having an upper end and a lower end, said indicator being operatively connected to said support member and being vertically adjustable relative to said support member;

a locking device on said support member configured to be loosened to permit vertical adjustment of said indicator relative to said support member and tightened to lock said indicator at a vertical position; and, an indicator surface located on said housing positioned to contact said indicator when said housing is lowered into contact with said indicator.

2. A router as defined in claim 1 wherein said indicator is an elongated tube having upper end, said tube having a pointer at its upper end, said indicator being adjustable relative to said support member.

3. A router as defined in claim 2 further comprising a spring for biasing said indicator upwardly into contact with said indicator surface.

4. A router as defined in claim 3 wherein said housing includes a depth scale located adjacent said pointer for providing a visual indication of the depth of cut.

5. A router as defined in claim 1 further comprising at least one depth stop turret member operatively attached to said housing and being selectively movable into and out of contact with said indicator.

6. A router as defined in claim 5 wherein said at least one depth stop turret member specifies a predetermined distance from said indicator surface.

* * * * *